3,155,680
PROCESS FOR THE PREPARATION OF 3-AMINO-
1,2,5-THIADIAZOL-4-CARBOXYLIC ACID, AND
OF NEW DERIVATIVES THEREOF
Kurt Menzl, Linz, Austria, assignor to Österreichische
Stickstoffwerke Aktiengesellschaft, Linz, Austria
No Drawing. Filed Jan. 29, 1963, Ser. No. 254,578
Claims priority, application Austria Feb. 9, 1962
6 Claims. (Cl. 260—306.8)

The present invention relates to a new, advantageous process for the preparation of 3-amino-1,2,5-thiadiazol-4-carboxylic acid, of its new $N_3$-monosubstituted derivatives of the new amides and hydrazides of these acids. In particular, the invention relates to a process for the preparation of acids, acid amides and acid hydrazides of the 1,2,5-thiadiazol, which have an amino group or a substituted amino group in the 3-position, by cleavage of the 2,6-diketo-8-thiapurines through the action of aqueous alkaline media such as aqueous alkalies or hydrazine hydrate.

It is known that 3-amino-1,2-5-thiadiazol-4-carboxylic acid can be obtained by the oxidation of benzothiadiazol with potassium permanganate to 1,2,5-thiadiazol-3,4-dicarboxylic acid, conversion of the latter into the diamide and subsequent Hoffman-type acid degradation, whereby only one carboxyl group is exchanged for the amino group. This method, in addition to being very complicated, is suitable only for the preparation of the 3-amino-1,2,5-thiadiazol-4-carboxylic acid itself, but not for the its $N_3$-substituteed derivatives.

It has now been found, that 3-amino-1,2,5-thiadiazol-4-carboxylic acid and its new $N_3$-monosubstituted derivatives as well as the new amides and hydrazides of these acids of the general formula

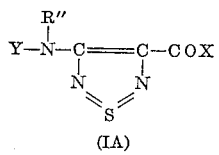

(I)

in which R' represents a hydrogen atom or an alkyl radical, R'' represents a hydrogen atom or, in the acid amide derivatives, a carboxyl group, X represents a hydroxyl group, a hydrazino group or the group —NHR, where R is a hydrogen atom or an alkyl radical, can be obtained in a simple manner and with good yields by cleavage of the pyrimidine ring in 2,6-diketo-8-thiapurine or in its 3- or 1,3-substituted derivatives of the general formula

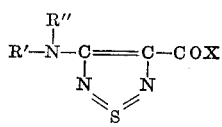

(II)

wherein R and R' have the meaning given above, by treatment with an alkaline agent, such as an alkali metal hydroxide or hydrazine hydrate.

The present invention also provides a compound having the general formula

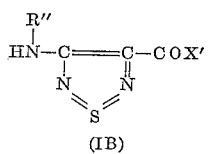

(IA)

or

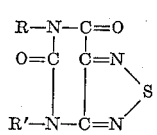

(IB)

wherein Y represent a lower alkyl, R'' represents a hydrogen atom or, in the acid amide derivatives, a carboxyl group, X represents a hydroxyl group, a hydrazino group or the group —NHR, where R is a hydrogen atom or an alkyl radical, and X' represents a hydrazino group or the group —NHR, where R is a hydrogen atom or an alkyl radical.

The alkaline treatment of the present invention renders possible the preparation of 3-amino-1,2,5-thiadiazol-4-carboxylic acid or of an N-monosubstituted derivative thereof either directly (II→VI), which may for example be achieved by prolonged boiling with sodium or potassium hydroxide, or by first preparing the amide of the acid through a shorter reaction with the sodium or potassium hydroxide (II→III; II→IV), or by preparing, through the action of hydrazine hydrate (II→V), the hydrazide of the acid, which can then be converted into the corresponding carboxylic acid by means of saponifying agents, in particular alkali metal hydroxides.

There are thus formed, under cautious treatment with alkaline agents, such as heating to the boil with 5% alkali and subsequent cooling, firstly the possibly substituted carboxyamino-carboxylic acid amides of Formula III which are transformed by decarboxylation, for example by boiling their sodium salt in aqueous solution, into the possibly substituted carboxylic acid amides of Formula IV, which then can be saponified by boiling with aqueous sodium or potassium hydroxide to obtain the free carboxylic acids. However, it is also possible to saponify the carboxylamino-carboxylic acid amides of Formula III directly with the aid of alkali metal hydroxides to form the carboxylic acids. The carboxylic acid amides of Formula IV can also be obtained directly on cleavage by cautious treatment with bases. Which of the intermediate compounds (III and IV) will predominate depends not only on the conditions of the reaction, but also on the starting material. When unsubstituted 2,6-diketo-8-thiapurine is used as the starting material, 3-carboxy-amino-1,2,5-thiadiazol-4-carboxylic acid amide (III) usually predominates as the intermediate product, while the carboxylic acid amides of Formula IV usually predominate when 3- or 1,3-substituted 2,6-diketo-8-thiapurines are employed as the starting materials.

On reacting the 2,6-diketo-8-thiapurines of Formula II with hydrazine hydrate, there are formed firstly the carboxylic acid hydrazides of Formula V, which can also be saponified to yield the carboxylic acids of Formula I, by treating them with aqueous sodium- or potassium-hydroxide.

The compounds discussed above are presented in the following reaction sequence:

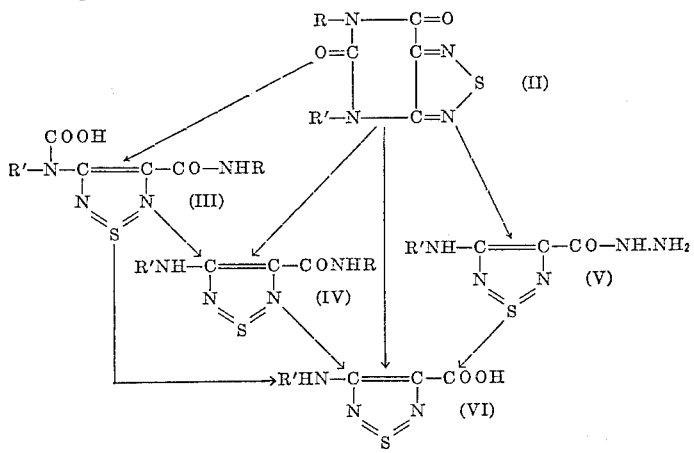

In the above formulae, R represents a hydrogen atom or an alkyl radical, R' represents a hydrogen atom or an alkyl radical.

The cleavage of the thiapurines of Formula II is preferably carried out in an aqueous medium. The direct conversion into the carboxylic acids of Formula I requires heating for several hours with a sodium hydroxide or potassium hydroxide solution. As a rule, the concentration of the alkali metal hydroxide solution employed is around 10%.

To precipitate the acid, it is expedient to acidify the mixture to about pH 1. If it is desired to interrupt the reaction at the amide stage, then a shorter reaction period, for example less than one hour, is recommended as well as a smaller amount of alkali, for example about half of the amount required for direct conversion into the carboxylic acid. When hydrazine hydrate is employed, the reaction always stops at the hydrazide stage and the conversion into the free acid is then effected by subsequent treatment with an alkali metal hydroxide under heating.

The 3-amino-1,2,5-thiadiazol-4-carboxylic acid and its $N_3$-monosubstituted derivatives are valuable intermediates for the preparation of pharmaceuticals, particularly of sulphonamides. The amides and hydrazides of these acids are of interest as anti-methabolic substances in the metabolism of nucleic acids.

The invention is illustrated in the following examples. The amounts indicated in the examples are by weight.

*Example 1*

1 mol of 2,6-diketo-8-thiapurine is boiled with 4 mols of 10% sodium hydroxide for 4 hours under reflux. The boiling solution is subsequently acidified to pH 1 with hydrochloric acid. 3-amino-1,2,5-thiadiozal-4-carboxylic acid crystallises on cooling, having a melting point of 214 to 218° C., with a yield which is 92% of the theoretical. After recrystallisation from water with addition of some bone char, the acid displays a melting point of 217° to 218° C.

In a similar manner, there can be obtained—
From 1,3-dimethyl-2,6-diketo-8-thiapurine: 3-methyl-amino-1,2,5-thiadiazol-4-carboxylic acid melting at 205° to 206° C., with a yield of 71% of the theoretical.

From 3-methyl-2,6-diketo-8-thiapurine: 3-methylamino-1,2,5-thiadiazol-4-carboxylic acid melting at 205° to 206° C., with a yield of 74.5% of the theoretical.

From 3-ethyl-2,6-diketo-8-thiapurine: 3-ethylamino-1,2,5-thiadiazol-4-carboxylic acid melting at 131° to 134° C., with a yield of 74.5% of the theoretical.

From 3-n-propyl-2,6-diketo-8-thiapurine: 3-n-propylamino-1,2,5-thiadiazol-4-carboxylic acid melting at 133° to 135° C., with a yeld of 79.4% of the theoretical.

The same results are obtained when 4 mols of 10% potassium hydroxide are employed instead of the 4 mols of 10% sodium hydroxide.

*Example 2*

1 mol of 1,3-dimethyl-2,6-diketo-8-thiapurine is slowly heated to the boil with 2 mols of 5% sodium hydroxide and then allowed to cool. The initial oily product precipitating crystallises on cooling and is filtered off and dried. There is obtained in this manner the 3-methyl-amino-12,5-thiadiazol-4-carboxylic acid-N-methyl amide melting at 95° C., with a yield of 74% of the theoretical.

0.058 mol of the methyl amide thus obtained are boiled with 0.14 mol of 10% sodium hydroxide for 2 hours under reflux. The solution is acidified while still hot by the addition of acid to pH 1 and is then cooled. The crystalline product separating is filtered off and dried. 3-methyl-amino-1,2,5-thiadiazol-4-carboxylic acid is thus obtained, melting at 205° C., with a yield of 88.6% of the theoretical.

*Example 3*

0.25 mol of 2,6-diketo-8-thiapurine are heated to the boil for half an hour with 0.5 mol of 5% sodium hydroxide and then left to cool. The sodium salt of the 3-carboxy-amino-1,2,5-thiadiazol-4-carboxylic acid amide separates during cooling in a crystalline form (yield: 73.1%). The amide is isolated, dissolved in hot water and acidified with hydrochloric acid. There is obtained the 3-carboxy-amino-1,2,5-thiadiazol-4-carboxylic acid amide melting at 230° to 234° C., with a yield of 71.9% of the theoretical.

0.025 mol of the sodium salt of the 3-carboxy-amino-1,2,5-thiadiazol-4-carboxylic acid amide are heated with 0.06 mol of 10% sodium hydroxide for two hours under reflux. After acidifying the still hot solution to pH 1, it is left to cool, whereby a crystalline product separates which is isolated and dried. There is obtained the 3-amino-1,2,5-thiadiazol-4-carboxylic acid melting at 217° to 218° C. with a yield of 94.6% of the theoretical.

*Example 4*

0.5 mol of 1,3 - dimethyl-2,6-diketo - 8 - thiapurine is heated with 200 cc. of 98% hydrazine hydrate to simmer for 1½ hours. At first a clear solution is formed, from which the acid hydrazide separates while the solution is still hot. The crystalline pulp is digested with water after cooling and the crystals separated are filtered off. There is obtained the 3-methyl-amino-1,2,5-thiadiozol-4-carboxylic acid hydrazide, melting at 195° C., with a yield of 80% of the theoretical.

0.035 mol of 3 - methylamino - 1,2,5-thiadiazol-4-carboxylic acid hydrazide are heated to the boil with 0.14 mol of 10% sodium hydroxide for 3 hours under reflux. The reaction mixture is subsequently diluted with water, some bone char is added thereto, and the whole is filtered while still hot.

The filtrate is acidified to pH 1 and left to cool. After cooling, the separated crystallisate is filtered off and dried. There is obtained the 3-methylamino-1,2,5-thiadiazol-carboxylic acid melting at 205° to 206° C., with a yield of 70.6% of the theoretical.

I claim:

1. In a process of producing derivatives of 3-amino-1,2,5-thiadiazole of the formula

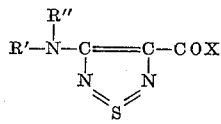

wherein R' is selected from the group consisting of hydrogen and lower alkyl, X is selected from the group consisting of the hydroxy group, the hydrazino group and the group —NHR, where R is selected from the group consisting of hydrogen and lower alkyl and R'' is selected from the group consisting of hydrogen and in the case where X is the group —NHR, the carboxy group, the step of heating a 2,6-diketo-8-thiapurine of the formula

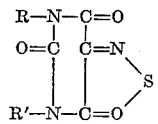

wherein R' is selected from the group consisting of hydrogen and lower alkyl and R is selected from the group consisting of hydrogen and, in the case where R' is a lower alkyl group, lower alkyl with an aqueous alkaline agent selected from the group consisting of aqueous sodium hydroxide, aqueous potassium hydroxide and hydrazine hydrate, the quantity of said aqueous alkaline agent being more than 1 mol per mol of said 2,6-diketo-8-thiapurine, to a temperature sufficient to effect cleavage of the pyrimidine ring of said 2,6-diketo-8-thiapurine.

2. The process of claim 1 in which said alkaline agent is aqueous 5–10% sodium hydroxide, the quantity thereof being about 2 to 4 mols per mol of said 2,6-diketo-8-thiapurine.

3. A process of producing a 3-amino-1,2,5-thiadiazole carboxylic acid compound of the formula

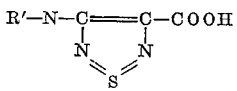

comprising boiling a 2,6-diketo-8-thiapurine compound of the formula

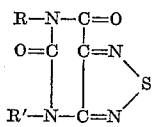

wherein R' is selected from the group consisting of hydrogen and lower alkyl and R is selected from the group consisting of hydrogen and, in the case where R' is lower alkyl, lower alkyl with aqueous sodium hydroxide until the sodium salt of said 3-amino-1,2,5-thiadiazole carboxylic acid compound is formed, the molar ratio of sodium hydroxide to the 2,6-diketo-8-thiapurine compound being about 4:1, and acidifying the reaction solution to liberate the 3-amino-1,2,5-thiadiazole carboxylic acid.

4. A process of producing a 3-amino-1,2,5-thiadiazole carboxylic acid hydrazide of the formula

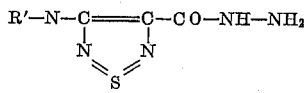

comprising boiling a 2,6-diketo-8-thiapurine compound of the formula

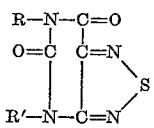

wherein R' is selected from the group consisting of hydrogen and lower alkyl and R is selected from the group consisting of hydrogen and, in the case where R' is lower alkyl, lower alkyl with more than 1 mol of hydrazine hydrate per mol of said 2,6-diketo-8-thiapurine until said 3-amino-1,2,5-thiadiazole carboxylic acid hydrazide is formed.

5. A process of producing a 3-lower alkyl amino-1,2,5-thiadiazole-4-carboxylic acid lower alkyl amide comprising heating a 1,3-di-lower alkyl-2,6-diketo-8-thiapurine with aqueous sodium hydroxide in a mol ratio of sodium hydroxide to the thiapurine not more than 2 to 1 to the boil until cleavage of the pyrimidine ring of the thiapurine takes place and said 3-lower alkyl amino-1,2,5-thiadiazole-4-carboxylic acid lower alkyl amide is formed and then cooling the reaction solution to terminate the reaction.

6. A process of producing 3-carboxy-amino-1,2,5-thiadiazole-4-carboxylic acid amide comprising heating 2,6-diketo-8-thiapurine with aqueous sodium hydroxide in a mol ratio of sodium hydroxide to thiapurine not more than 2 to 1 to the boil until cleavage of the pyrimidine ring of the thiapurine takes place and the sodium salt of said 3-carboxy-amino-1,2,5-thiadiazole-4-carboxylic acid amide is formed, then cooling the reaction solution to terminate the reaction and acidifying to liberate the free 3-carboxy-amino-1,2,5-thiadiazole-4-carboxylic acid amide.

References Cited in the file of this patent

Schrage et al.: J. Org. Chem., vol. 16, pages 207–215 (1951).